United States Patent [19]
Behi et al.

[11] Patent Number: 6,056,915
[45] Date of Patent: May 2, 2000

[54] RAPID MANUFACTURE OF METAL AND CERAMIC TOOLING

[75] Inventors: Mohammad Behi, Lake Hiawatha; Mike Zedalis, Mendham; James M. Schoonover, Flemington, all of N.J.

[73] Assignee: AlliedSignal Inc., Morris Township, N.J.

[21] Appl. No.: 09/176,509

[22] Filed: Oct. 21, 1998

[51] Int. Cl.$^7$ ........................................................ B22F 7/00
[52] U.S. Cl. .............................. 419/6; 419/38; 264/328.1
[58] Field of Search ................................. 419/38, 41, 5.6; 264/109, 328.1, 478

[56] References Cited

U.S. PATENT DOCUMENTS

| | | | |
|---|---|---|---|
| 4,225,345 | 9/1980 | Adee et al. | |
| 4,721,599 | 1/1988 | Nakamura | 419/23 |
| 5,015,289 | 5/1991 | Toda et al. | 75/229 |
| 5,250,254 | 10/1993 | Achikita et al. | 419/37 |
| 5,328,657 | 7/1994 | Kamel et al. | 419/36 |

*Primary Examiner*—Ngoclan Mai
*Attorney, Agent, or Firm*—John A. Squires; Roger H. Criss

[57] ABSTRACT

A method for rapidly manufacturing metal tooling utilizing injection molding techniques is described. Preferably, steel tooling is manufactured for use in an injection molding machine to produce near-net shape complex parts in high volume. The method is relatively inexpensive compared to conventional techniques for manufacturing complex metal tooling suitable for the rapid fabrication of complex shaped parts by conventional metal, ceramic and plastic processing.

19 Claims, 2 Drawing Sheets

RAPID MANUFACTURE OF METAL AND CERAMIC TOOLING

FIELD OF THE INVENTION

This invention relates to a process for the rapid production of metal and ceramic near-net shape tooling using injection molding techniques. More particularly, the invention is directed to the manufacture of steel tooling by a powder metal injection molding process for use as stand-alone tools or as tool inserts in a cavity of a tool and frame fixture. Tool inserts can be produced economically in a relatively short period of time and are interchangeable within the cavity of the fixture. The fixture is designed to be attached to an injection molding machine to produce finished parts of a desired shape.

This invention further contemplates the manufacture of finished parts in an injection molding machine using a tool insert made by the rapid manufacturing process according to the present invention.

BACKGROUND OF THE INVENTION

It is well known in the prior art to manufacture steel tooling and tool inserts for use in injection molding fixtures to produce net shape complex metal and plastic parts in high volume. However, conventional manufacture of such tooling and inserts from wrought metal stock is very costly and time consuming, typically taking up to 28 weeks to manufacture, and requiring large amounts of precision machining for each insert. Each tool insert is usable to manufacture one shape of part.

The present invention overcomes these shortcomings by disclosing production of steel tool inserts by a metal injection molding process described hereinafter, which offers significantly faster cycle times and is relatively inexpensive compared to conventional production of steel tools. Costly machining is eliminated or greatly reduced and is replaced by a near net shape injection molding process.

The production of sintered parts from "green" bodies is well known in the prior art. Generally the green body is formed by filling a die with a powder/binder mixture and compacting the mixture under pressure. The green body, which is a self-supporting structure, is then removed from the die and sintered. During the sintering process, the binder is volatilized and burned out. The sintered part is typically not fully dense (approximately 85–90% of theoretical density) and has substantially reduced mechanical properties compared to wrought material.

Injection molding is a preferred process for manufacturing complex, near-net shape parts from metal and ceramic powders. The tools for producing injection molded parts are generally made from metals such as tool and stainless steels due to the high pressures and temperatures normally required for metal and ceramic feedstock materials. As previously mentioned, conventional manufacture of metal tooling from wrought metal frequently involves long turnaround times, a great deal of precision machining and is very costly.

Injection molding fixtures, which are well known in the art, are designed to interchangeably accept different tool inserts and to be attached to injection molding machines, thus providing highly cost effective production of near-net shape, complex metal, ceramic and plastic parts in high volume.

BRIEF SUMMARY OF THE INVENTION

The present invention overcomes these shortcomings and is directed to a method for rapidly manufacturing tooling, preferably made from metal or ceramic materials, for subsequent use in the manufacture of shaped parts, such as by injection molding. The method includes the steps of providing a mold of a desired shape tool, inserting the mold in an injection molding machine, introducing a powder feedstock material into the injection molding machine at appropriate temperatures and pressures and for the appropriate amounts of time in order to mold a green tool, and sintering the green tool at the appropriate temperatures and for the appropriate amounts of time to achieve final density of the tool. The mold is typically comprised of a core and cavity, and the tool produced by this process is considered a near net shape tool requiring little or no final machining. Such near net shape tools are used as inserts or stand-alone tools for the manufacture of metal, ceramic or plastic components that are fabricated by traditional manufacturing techniques including injection molding, press-forging, blanking or drawing.

The invention further includes a method for manufacturing near-net shape parts using the tooling manufactured in accordance with the present invention. The method includes the steps of providing a mold of a desired shape tool, inserting the mold in an injection molding machine, introducing a first powder feedstock material into the injection molding machine at appropriate temperatures and pressures and for the appropriate amounts of time in order to mold a green tool, sintering the green tool at the appropriate temperatures and for the appropriate amounts of time to achieve final density of the tool, inserting the tool into the cavity of a fixture, mounting an ejector system on the tool, mounting the fixture on an injection molding machine, and introducing a second powder feedstock material into the injection molding machine at appropriate temperatures and pressures and for the appropriate amounts of time to mold the desired part.

DETAILED DESCRIPTION OF THE INVENTION

Tooling or tool inserts of any shape, including complex shapes, are formed according to this invention from powder materials selected from metal or ceramic feedstock materials. Metal feedstock materials include all types of tool and stainless steels. As used herein, the term metal feedstock includes powders of pure metals, alloys, intermetallic compounds and mixtures thereof The process used to make the tool inserts is known as a near-net shape metal injection molding (MIM) process, as described in Fanelli et al, U.S. Pat. No. 4,734,237, and as further described in U.S. patent application Ser. No. 09/141,444, the disclosures of both of which are incorporated herein by reference.

The present invention involves making a tool insert from a master or pattern. The master/pattern may be made by any number of suitable methods well known to those skilled in the art, such as by machining wrought metal, casting, or grown SLA masters from a 3-D CAD file. Preferably, the master/pattern is made from an epoxy, aluminum or steel. Resin, most preferably urethane or epoxy, is pre-mixed with the reinforcement filler and cast around the master. After the resin cures to a solid forming a mold, the master is removed and secondary operations can be performed on the mold to produce desired results.

Figure 1:
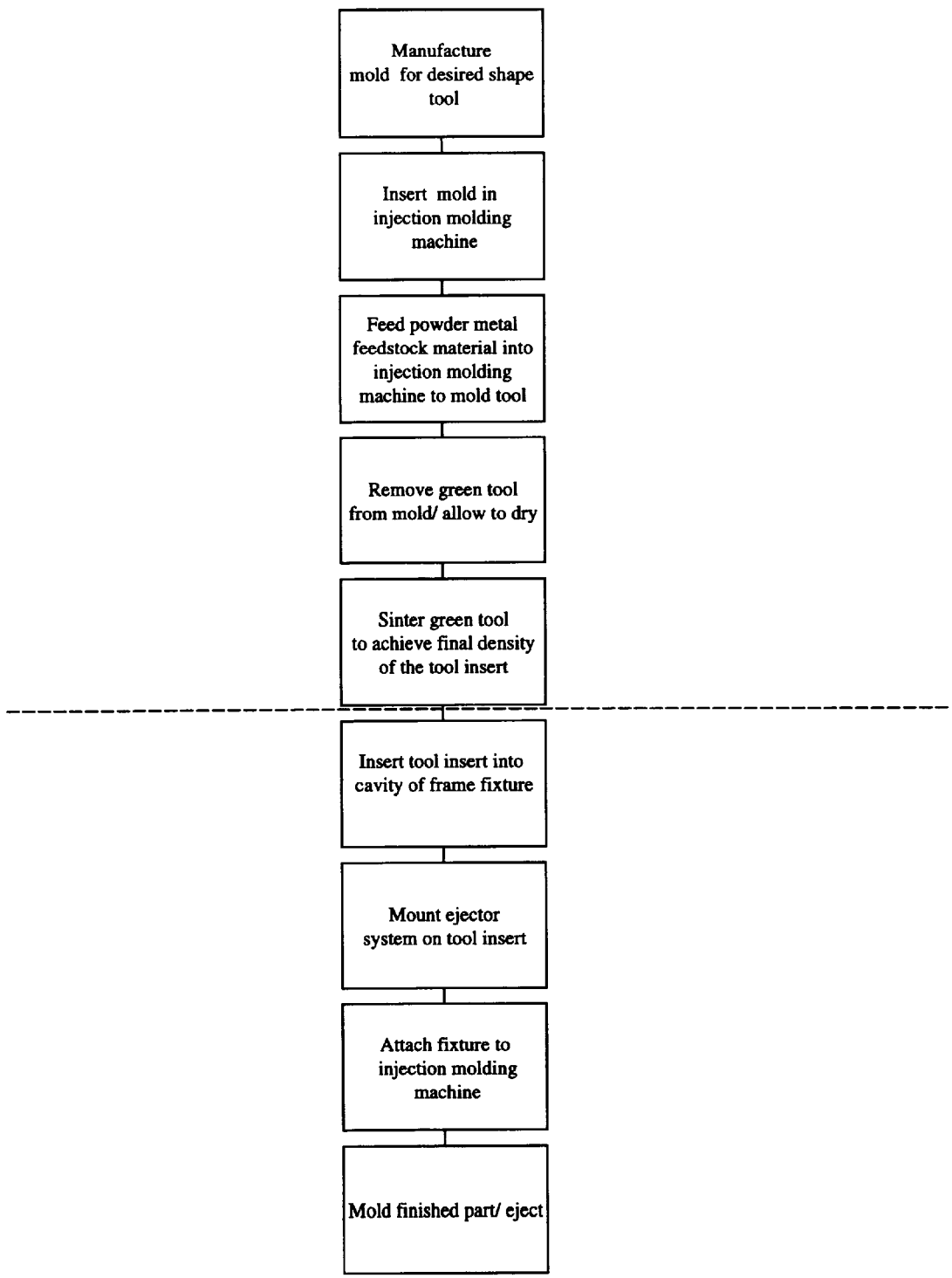
FIG. 1 is a schematic flow diagram of the method for the rapid manufacture of metal tooling according to the present invention, and further includes the method for manufacturing near-net shape finished parts from the tooling.

In a preferred embodiment of the present invention, FIG. 1 schematically illustrates a flow diagram of the process for rapidly manufacturing metal tooling for use in an injection molding process to produce desired parts, including the following steps:

a) manufacturing a mold for the tool;

b) inserting the mold in an injection molding machine;

c) feeding a powder metal feedstock material into the injection molding machine at appropriate temperatures and pressures and for the appropriate amounts of time in order to mold a green tool;

d) removing the green tool from the mold and allowing it to dry; and e) sintering the green tool in a furnace at the appropriate temperatures and for the appropriate amounts of time to achieve final density of the metal tool.

It should be understood that the mold could be made from an epoxy, aluminum or steel, and should reflect appropriate shrinkage data for the tool feedstock material being used. Final machining of the metal tool may be necessary to obtain the exact dimensions required. Once the metal tool meets all required properties, the desired final parts are manufactured in an injection molding machine utilizing the following process which is also illustrated in FIG. 1 below the dotted line:

f) inserting the metal tool into a cavity of a metal frame fixture to be used for injection molding of the desired parts;

g) mounting an appropriate ejector system on the metal tool to remove the molded part from the cavity;

h) attaching the fixture to an injection molding machine; and i) molding the finished part and ejecting it from the mold.

Injection molding of the metal tool, preferably stainless steel, is carried out using feedstock materials containing aqueous, polysaccharide-based binder materials. Such binder materials are well known and are described in Fanelli et al. After molding, the final parts are dried and fired according to established firing schedules required to produce the desired properties in the material being molded. Firing schedules are well known in the art for a multitude of metal and ceramic materials and need not be described herein. The metal tool manufactured in accordance with the present invention is well suited for use in conventional plastic forming (e.g. plastic injection molding or compression molding), ceramic injection molding, powder injection molding, powder forming processes and conventional wrought forming processes.

The following example is provided to illustrate a preferred embodiment of the invention. This example, however, is considered to be illustrative only and is not intended to limit the scope and content of the invention or obvious variations thereof.

Example 1

Figure 2:
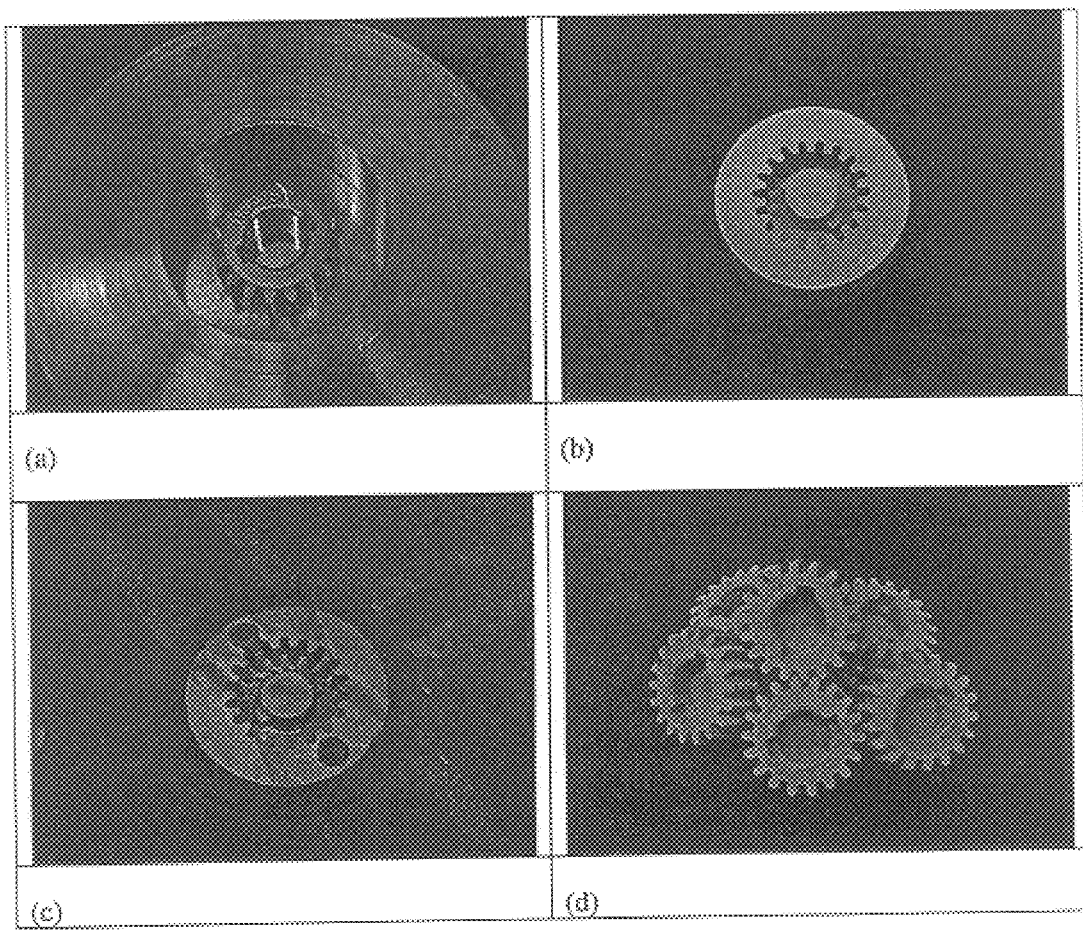
FIG. 2 includes multiple photographs of (a) a gear pattern mold used in the method of the present invention, (b) a molded green tool made from the gear pattern mold, (c) a sintered tool mounted into a fixture, and (d) molded finished parts made in accordance with the method of the present invention.

A gear pattern shown in FIG. 2(a) was designed with a 1.1 inch diameter and 0.36 inch thickness in order to fabricate a tool mold to be used in a cavity of a "mud" frame fixture. The term "mud" frame fixture is known to those skilled in the art and derives its name from the family of fixtures manufactured by Master Unit Die Products, which are designed to be used on injection molding machines. It should be understood that the gear pattern could be made from different materials including aluminum or other metals, epoxy, or high temperature polymers. The present gear pattern was made from stainless steel and installed in a mud frame fixture of a BOY15S injection molding machine. The molding machine was loaded with 316L stainless steel feedstock material at 80–85° C., generally as described in Fanelli et al. It should be understood that any of a number of other stainless steel alloys such as 17-4PH, 410, 420 or 440C could have been substituted for the 316L stainless steel feedstock material. The molten feedstock material was injected into the gear pattern at approximately 400–500 psi injection pressure and held at about 200–300 psi for approximately 2–3 seconds, and held thereafter for an approximate 30 second cooling time. It should be further understood that an acceptable range of injection pressures is approximately 400–900 psi, an acceptable range of molding pressures is approximately 200–600 psi, and an acceptable range of holding times for molding the tool is 2–5 seconds. Cooling times will vary with the thickness of the tool and the mold material, but should normally range from 30 to 300 seconds.

The molded "green" tool shown in FIG. 2(b) was removed from the gear pattern and allowed to dry at room temperature for approximately 1–2 hours. At this point the green tool mold was a self supporting body which required no special handling for further processing. The green tool mold was then placed in a furnace and sintered at approximately 1300–1400° C. for about 2 hours to produce the densified final stainless steel tool for manufacturing the final gear parts. The stainless steel tool attained about 98% of theoretical density and experienced about 14.5–15.5% linear shrinkage.

The tool was then inserted into a cavity of a mud frame fixture as shown in FIG. 2(c) to be used for injection molding of the desired gear parts. An appropriate ejector system was mounted on the tool within the cavity of the fixture to eject the molded part from the cavity. Such ejector systems are well known to those skilled in the art and need not be described further. The mud frame fixture, including the tool insert, was mounted on a 55 ton Cincinnati injection molding machine, and 316L stainless steel feedstock material was injected into the tool at the previously described temperatures and pressures to mold the gear part. These molded parts shown in FIG. 2(d) were in the green state and had to be sintered at an appropriate firing schedule to achieve the required properties. A large number of metal and plastic parts were molded with this tool. Once production of the gear part was completed, the metal tool was removed from the cavity of the fixture, and the fixture was ready to accept a new tool for producing a different part. Interchangeability of tooling in fixtures of the type used herein is well known and need not be described in detail.

The aforementioned rapid tool manufacturing capability had heretofore not been available for making complex shaped parts from powder materials in a high volume production environment. The present invention therefore satisfies a longstanding need.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. A method for the rapid manufacture of a tool comprising the steps of:
   a. providing a mold of a desired shape;
   b. inserting the mold in an injection molding machine;
   c. introducing a powder feedstock material into the injection molding machine at appropriate temperatures, an injection pressure between approximately 400–900 psi and for the appropriate amounts of time in order to mold a green tool; and
   d. sintering the green tool at the appropriate temperatures and for the appropriate amounts of time to achieve final density of the tool.

2. The method of claim 1, wherein the mold is made from a material selected from the group consisting of metals, epoxy and high temperature polymers.

3. The method of claim 2, wherein the material is steel.

4. The method of claim 1, wherein the powder feedstock material includes powder selected from the group consisting of stainless steel alloys, tool steels, carbide materials and copper alloys.

5. The method of claim 1, wherein the powder feedstock material includes powder selected from the group consisting of 316L, 17-4PH, 410, 420 and 440C stainless steel alloys, H13 and H11 tool steels, M2 carbide, and alloys of brass and bronze.

6. The method of claim 1, wherein the temperature of the feedstock material during introduction into the injection molding machine is between approximately 80–85° C.

7. The method of claim 1, wherein the molding hold pressure is between approximately 200–600 psi.

8. The method of claim 1, wherein the sintering temperature is between approximately 1300–1400° C.

9. The method of claim 1, wherein the sintering time is approximately two hours.

10. A method for manufacturing a desired part comprising the steps of:
    a) providing a mold of a desired shape tool;
    b) inserting the mold in an injection molding machine;
    c) introducing a first powder feedstock material into the injection molding machine at appropriate temperatures and pressures and for the appropriate amounts of time in order to mold a green tool;
    d) sintering the green tool at the appropriate temperatures and for the appropriate amounts of time to achieve final density of the tool;
    e) inserting the tool into a cavity of a fixture;
    f) mounting an ejector system on the tool;
    g) mounting the fixture on an injection molding machine;
    h) introducing a second powder feedstock material into the injection molding machine at appropriate temperatures and pressures and for the appropriate amounts of time to mold the desired part.

11. The method of claim 10, wherein the mold is made from a material selected from the group consisting of metals, epoxy and high temperature polymers.

12. The method of claim 11, wherein the material is steel.

13. The method of claim 10, wherein the first powder feedstock material includes powder selected from the group consisting of stainless steel alloys, tool steels, carbide materials and copper alloys.

14. The method of claim 10, wherein the first powder feedstock material includes powder selected from the group consisting of 316L, 17-4PH, 410, 420 and 440C stainless steel alloys, H13 and H11 tool steels, M2 carbide, and alloys of brass and bronze.

15. The method of claim 10, wherein the temperature of the first powder feedstock material during introduction into the injection molding machine is between approximately 80–85° C.

16. The method of claim 10, wherein the injection pressure is between approximately 400–900 psi.

17. The method of claim 10, wherein the molding hold pressure is between approximately 200–600 psi.

18. The method of claim 10, wherein the sintering temperature is between approximately 1300–1400° C.

19. The method of claim 10, wherein the sintering time is approximately two hours.

* * * * *